Figure 1:
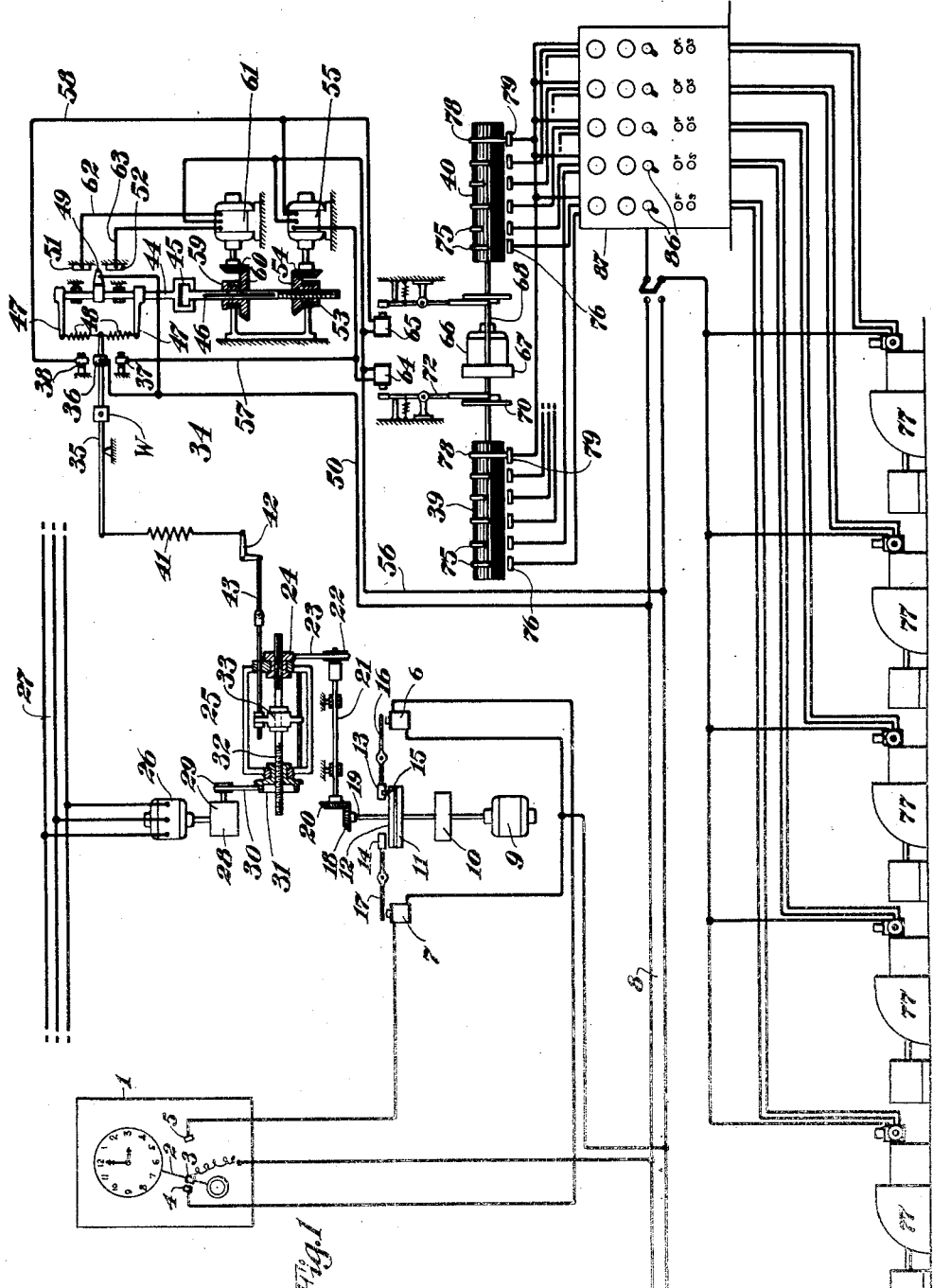

Dec. 15, 1931.  C. H. SMOOT  1,836,559
FREQUENCY REGULATOR
Filed July 24, 1929  2 Sheets-Sheet 1

Dec. 15, 1931.  C. H. SMOOT  1,836,559
FREQUENCY REGULATOR
Filed July 24, 1929  2 Sheets-Sheet 2
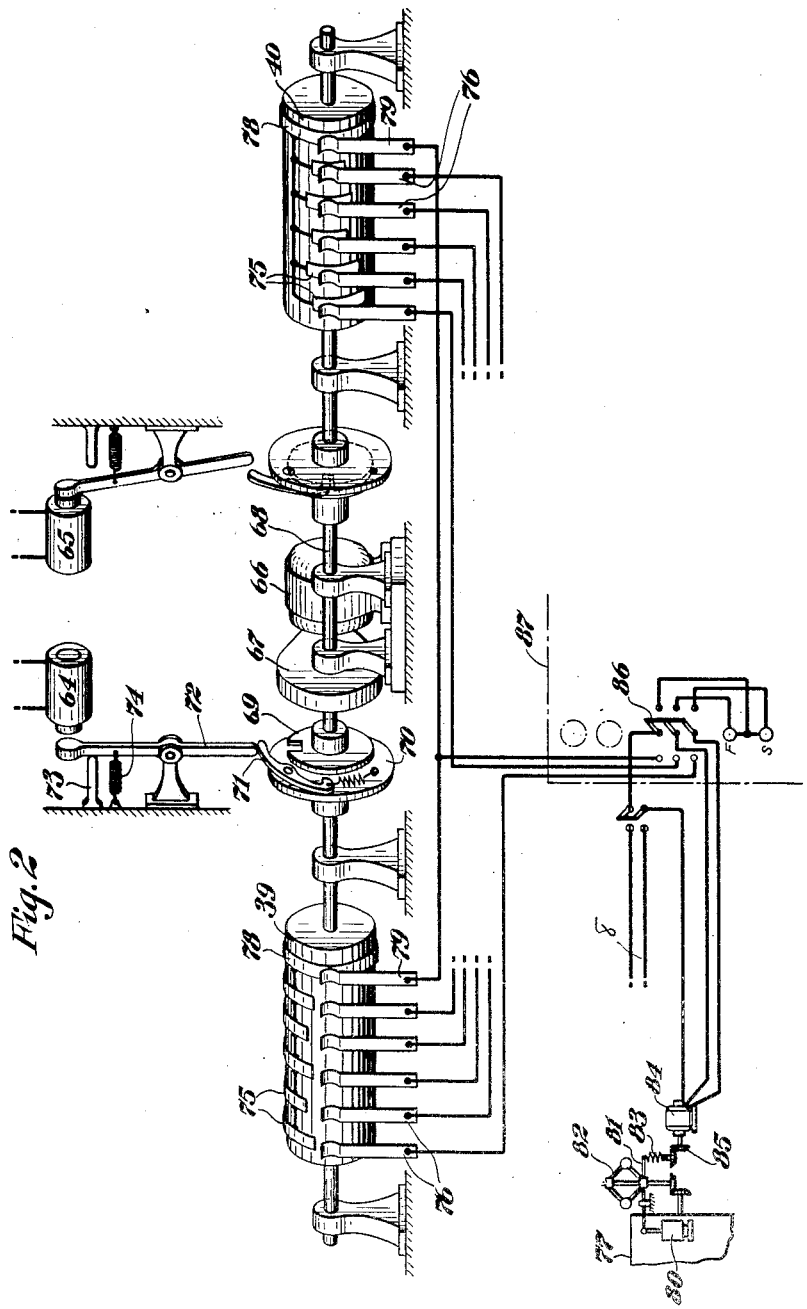
INVENTOR
Charles H. Smoot,
BY
Bartlett, Eyre, Scott & Keel
ATTORNEYS Patented Dec. 15, 1931

1,836,559

UNITED STATES PATENT OFFICE

CHARLES H. SMOOT, OF MAPLEWOOD, NEW JERSEY

FREQUENCY REGULATOR

Application filed July 24, 1929. Serial No. 380,514.

My invention relates to systems for regulating alternating current frequency and comprises a novel combination of interrelated elements so arranged as to permit of accurate regulation to any desired frequency. My invention is so devised as to insure not only that the frequency, upon departure from that desired, will be rapidly returned to the initial value, but also that the average frequency over a period of time will be controlled as well.

Accurate control of frequency of alternating current is of particular importance in the modern electrical clock systems, in which small alternating current motors, operating in parallel, drive secondary clocks, the accuracy of which depends upon uniformity of the frequency of the impressed voltage. In such a system, it is not sufficient, upon a departure of the frequency from that desired, to merely return the frequency to its initial value, for, during the interval of departure, the clocks have operated too rapidly or too slowly depending upon the direction of departure, and consequently will thereafter continue to be in error in their readings even after the return to the desired frequency. My invention eliminates this error by insuring the average frequency over intervals of time is that for which the system is adjusted. Moreover, my apparatus is such that the intervals of time over which the average freqeuncy is maintained constant are relatively short, thus insuring substantially continual accuracy in the clock readings. Although of particular value in the regulation of such clock systems as above described, my invention is not limited to such use, as it may be advantageously employed wherever accurate regulation of frequency is desired, irrespective of the particular use to which the controlled frequency may be put.

My invention comprises the combination of a regulator of the type of my Patent No. 1,658,577, dated February 17, 1928, with a device adapted to compare the frequency to be controlled with a standard frequency and controlling means adapted to effect the regulation of the power generator or generators in response to operation of the regulator.

More specifically my invention comprises a master clock arranged to adjust the speed of a driven member to maintain the same constant; a differential speed device adapted to compare the controlled speed of this driven member with the speed of a second driven member proportional to the frequency to be controlled; and a regulating unit of the type of my said patent thrown into operation by the differential speed device and adapted to effect control of the power generator or generators. Ordinarily my novel apparatus would be installed at a central power house to there control the frequency of the generated current, before delivery to consumers. For this purpose I provide drum controllers so cooperating with the regulator in control of the generators as to permit of concurrent regulation of generators having different capacities or characteristics. Preferably also, means are provided whereby the automatic control may be cut out and manual control substituted therefor.

For a better understanding of my invention, reference should be had to the accompanying drawings, of which—

Fig. 1 represents, more or less diagrammatically, one embodiment of my invention as applied to the control of frequency of the voltage generated by a series of turbines; and Fig. 2 is an enlarged view partly in perspective showing the drum controllers and electrical circuits controlled thereby.

Referring to the drawings, a master clock 1, adjusted for accurate operation by any well known means, carries on its pendulum 2 a contact 3 adapted to engage a stationary contact 4 at one extreme position of oscillation and to engage a second stationary contact 5 at its other extreme position of oscillation. Closure of contacts 3 and 4 energizes an electromagnet 6 and closure of contacts 3 and 5 energizes an electromagnet 7 by completion of electrical circuits including a source of electromotive force, indicated by the power lines 8, one line of which is connected to contact 3 and the other line of which is connected to one terminal of each electromagnet; the other terminals of electromagnets 6 and 7 being connected to contacts 4 and 5 respectively. A synchronous motor 9 drives, through gear reduction 10, a disk 11; the reduction being such as to cause disk 11 to rotate at a speed slightly greater than one revolution per second. A second disk 12 is in frictional engagement with disk 11 and is driven thereby except when positively arrested by means of stops 13 or 14 engaging a projection 15 upon the surface of disk 12. Stop 13 comprises one end of a pivoted lever 16, the other end of which acts as an armature for magnet 6. Stop 13 is normally maintained by gravity in the path of travel of projection 15, but is retracted therefrom upon energization of magnet 6 by attraction of the armature end of lever 16. Similarly stop 14 comprises one end of a pivoted lever 17 and the other end of which acts as an armature for magnet 7; stop 14 also being normally in the path of travel of projection 15 but being retracted therefrom upon energization of magnet 7. Assuming the pendulum of the master clock to make one complete oscillation per second, at each one-half second either stop 13 or 14 will release projection 15 to permit one-half rotation of disk 12, with the result that rotation of disk 12 is accurately controlled by the clock to one revolution per second. A gear 18 mounted on the shaft 19 of disk 12 meshes with a gear 20 to drive the same at the clock controlled speed. A shaft 21, carrying gear 20 at one end, is rotatably mounted in suitable bearings and carries at its other end a sprocket 22 arranged to drive, by means of a chain 23, a member 24 of the differential speed device 25.

A synchronous motor 26 is driven by current from the bus bars 27 carrying the current whose frequency is to be controlled. The motor 26, through gear reduction 28, sprocket 29 and chain 30 drives a second member 31 of the differential speed device. The differential speed device 25 comprises a rod 32, one end of which is threaded, and has screw-threadedly mounted thereon the member 31, and the other end of which is longitudinally slotted and has keyedly mounted thereon the member 24.

A member 33 is mounted on rod 32 intermediate the threaded and slotted portions thereof in such a manner as to be moved longitudinally with rod 32 but not to be rotated thereby. The arrangement of the differential speed device is such that rod 32 is rotated but not moved either to the right or to the left when member 31 is driven at the same speed as member 24, but is moved in one direction or the other when the speed of member 31 increases above or diminishes below that of member 24 due to variation in frequency of current in the main bus. Displacement of member 33 from its normal central position within device 25 thus serves to indicate a departure of the frequency from that desired. Member 33 could be employed to directly control, by its movement, the alternating current generators. Such an arrangement would not give satisfactory regulation, however, as it would result in continual hunting of the apparatus, with increasing magnitude of the variations in frequency. Such hunting is avoided by the combination of device 25 with a regulating unit 34 of the type described and claimed in my said patent, wherein departure from balance of controlled and controlling forces operates to adjust the element to be controlled and also to add a force to the balance in a direction to restore neutrality thereof, prior to the return of the controlled force to that desired, and to thereafter gradually remove the additional force. Regulator 34 is illustrated diagrammatically as comprising the pivoted lever 35 adapted when displaced from neutral to close electrical circuits by engagement of a contact 36 carried thereupon, with one or the other of stationary contacts 37 and 38 arranged below and above respectively contact 36, to throw into operation one or the other of the drum controllers 39 and 40 as will be more fully hereinafter described. A spring 41 one end of which is connected to the lever 35, normally opposes a weight W upon the balance lever to maintain the same in neutral position. Spring 41 is connected at its other end to one arm of a bell crank lever 42, the other arm of which is connected by a rod 43 with member 33. Departure of member 33 from normal position thus varies the tension of spring 41 to throw regulator 34 into operation.

Cooperatively associated with lever 35 is a rod 44 slidably mounted in fixed bearings and provided with a socket in its lower end in which the head 45 of a second rod 46 is free to turn. Rod 44 carries projecting arms 47 between the outer ends of which is attached a spring 48. The mid point of spring 48 is attached to lever 35 to transmit thereto upon vertical displacement of rod 44 an additional force aiding or opposing spring 41 thereupon. Rod 44 carries an electric contact 49 in electrical communication with contact 36 and with the power circuit 8 by means of conductor 50 and arranged to travel over and engage fixed contacts 51 and 52 upon upward and downward movement respectively of the rod 44. Rod 46 is threaded throughout its lower half and provided with longitudinal slots along its upper half. A member 53 is screw threadedly mounted on the lower half of the rod and is adapted to be rotated thereupon by bevel gears 54 driven by a reversible electric motor 55. Motor 55 has one terminal connected to the power lines 8 through conductor 56 and has its other terminals connected to the fixed contacts 37 and 38 through conductors 57 and 58 respectively, to cause operation in one direction or the other whenever lever 35 departs from neutral position. A member 59 is keyedly mounted on the upper portion of rod 47 and is adapted to be rotated by bevel gears 60 driven by a second reversible electric motor 61. Motor 61 has one terminal connected with the power lines 8 through conductor 56 and has its other terminals connected to stationary contacts 51 and 52 through conductors 62 and 63 whereby it is operated in one direction or the other whenever rod 44 is displaced from normal position.

The arrangement of the motors 55 and 61 with rods 44 and 46 is such that either motor alone can raise or lower the rods, and if both motors are operating simultaneously the travel of the rods will be the sum or difference of the travel that would be caused by either motor alone. As shown the gearing is so arranged that when the motors operate at equal speeds, motor 55 is arranged to cause greater travel of the rods. The connections to motor 55 are such that a closure of contacts 36 and 37 causes motor 55 to operate in such direction as to raise the rods and to thereby tend to return lever 35 to neutral position by means of the tensional force exerted thereupon through spring 48. The connections to motor 61 are such that engagement of contacts 49 and 51 due to upward movement of rod 44 energizes motor 61 to cause it to operate in such direction as to lower rod 44 and to thus return the rod to its initial position.

Regulator 34 controls the operation of drum controllers 39 and 40 by means of electromagnets 64 and 65. Magnet 64 is connected across conductors 56 and 57 and magnet 65 is connected across conductors 56 and 58 whereby magnet 64 is energized when motor 55 is operating in such direction as to raise rod 44 and magnet 65 is energized when motor 55 is operated in the reverse direction. A continuously driven motor 66 drives, through gear reduction 67, a power shaft 68 which is adapted to be coupled to the shaft of either drum controller 39 or 40. As seen best in Fig. 2 the coupling means for drums 39 comprise a notched disk 69 mounted on shaft 68 and a disk 70 carried on the shaft of drum 39 and having pivotally mounted thereon a latch 71 spring biased into a position to engage the notch in disk 69 and normally maintained out of engagement therewith by means of a trip 72 pivotally mounted on a stationary part of the apparatus. Trip 72 is normally maintained against a fixed stop 73 by a spring 74 in such position as to engage latch 71 to prevent rotation of drum 39. Upon energization of electromagnet 64, the upper end of trip 72 is attracted and the trip turns about its pivot and against the tension of spring 74 to release latch 71, whereupon the hooked end of the latch engages the notch in disk 69 when the continual rotation of the latter brings the notch into engaging position. Drum controller 39 is then rotated through one revolution and, if electromagnet 64 has become deenergized during such rotation, trip 72 again engages latch 71 to prevent further rotation of the drum. Means similar to those above described are associated with the shaft of drum controller 40 to couple the same to driving shaft 68 upon energization of electromagnet 65. It will be noted that both electromagnets 64 and 65 are never energized simultaneously and that deenergization of either during rotation of its respective drum controller does not cause the arrest of the rotation thereof until the drum has returned to its initial position.

The surfaces of drums 39 and 40 are of insulating material and each has mounted thereon transverse bands 75 of conducting material adapted to engage stationary contacts 76 during part of each rotation of the drum. The number of bands 75 on each drum correspond with the number of generators to be controlled. In the particular modification illustrated, five turbo-generators 77 supply the current to bus bars 27 and are arranged for control and there are, therefore, five contact bands 75 on each drum. Bands 75 may be of the same or different length, depending upon the relative characteristics of the generators to be controlled and of their speed control apparatus. Each drum is also provided with a conducting band 78 which is of greater length than any of bands 75 and may conveniently be arranged to completely encircle the drum. Bands 78 are arranged to engage fixed contacts 79 which contacts are each connected with one side of the power lines 8 through circuits hereinafter to be described. The contact bands 75 and 78 on each drum are all electrically connected together in any suitable manner.

The electrical arrangement is such that during rotation of drum 39 with the consequent engagement during part of each rotation of bands 75 with contacts 76 the speed of each turbo-generator is reduced by a definite predetermined amount, depending upon the length of the respective controlling band, and during each rotation of drum 40 the speed of each turbo-generator is correspondingly increased. In Fig. 2 the electrical circuits and controlling means for one turbine are shown in detail. In Fig. 2 the turbine governor valve is indicated at 80 and the control thereof by the position of a pivoted lever 81. A centrifugal governor 82 suitably driven from the shaft of the turbine acts upon the lever 81 in opposition to the tension of a spring 83 to normally adjust the valve 80 for constant turbine speed. A reversible electric motor 84, through bevel gears 85, is arranged when operated in one direction to increase the tension of spring 83 to thus increase the controlled speed of the turbine, and when operated in the reverse direction, to similarly reduce the controlled speed of the turbine. In the particular control arrangement illustrated, one terminal of motor 84 is connected with electrical power lines 8 and the other terminals are connected at two poles of a three pole double throw switch 86, of which the third pole is connected to the other side of the power lines 8. Switch 86 when thrown to the right connects motor 84 in circuit with push button switches S and F whereby manual control of the turbine may be effected; the switch S when closed causing operation of the motor in a direction to reduce the speed of the turbine and the switch F when closed causing operation in the reverse direction to increase the turbine speed. Switch 86 when thrown to the left, connects one terminal of motor 84 to one of the stationary contacts 76 associated with drums 39 and connects another terminal of the motor to one of the stationary contacts 76 associated with drum 40; closure of the switch to the left also connecting contacts 79 with the power lines 8.

Similar controlling circuits for the other turbines to be controlled are associated with the other stationary contacts 76 and with the other switches 86 on the control board 87. Rotation of drum 39 when switches 86 are thrown to the left, energizes the controlling motor at each turbine in such direction as to cause the centrifugal governor to reduce speed of the turbine by an amount determined by the length of the associated controlling band 75 on drum 39. Similarly each rotation of drum 40 when switches 86 are thrown to the left, energizes the controlling motor at each turbine to increase the controlled speed of the turbine by a predetermined amount.

The operation of the entire apparatus is as follows: If the frequency in the main bus 27 is that desired, and the average frequency over a length of time has not varied, then the members 24 and 31 of the differential speed device will be rotated at the same speed, causing rotation of rod 32 but no longitudinal movement thereof, and member 33 will be in the normal central position within device 25. Balance lever 35 of the regulator will be in neutral position with the tension of spring 41 just balancing the force exerted by the weight W thereupon. Motors 55 and 61 and electromagnets 64 and 65 will all be deenergized and rod 44 will be in the normal position with spring 48 exerting no force upon lever 35. Drum controllers 39 and 40 and motors 84 will all be idle. If now, for any reason, the frequency in bus bars 27 increase, the rate of rotation of member 31 will become higher than that of member 24, with the result that rod 32 will move longitudinally to the right carrying member 33 therewith.

The movement of member 33 decreases the tension of spring 41 and consequently weight W causes lever 35 to tip to close contacts 36 and 37 to thereby energize motor 55 and electromagnet 64, the motor operating to raise rod 44 to increase the tension in the upper half of spring 48 and the latter operating to release latch 71 to permit shaft 68 to rotate drum 39. During parts of each rotation of drum 39 the motors 84 are connected to the power line 8 in such manner as to cause operation in the direction to decrease the tensions of springs 83 by increments depending upon the respective lengths of the associated contact bands 75 on drum 39, and to thereby reduce the speed of each turbine and consequently the frequency of the generated voltage. Rotation of drum 39 continues as long as electromagnet 64 is energized due to unbalance of lever 35.

When the tension of springs 83 has been reduced sufficiently to return the frequency to that desired, the motion of member 33 to the right ceases, and if the decreased tension of spring 41 now balances the tension of spring 48 caused by the operation of motor 55, lever 35 returns to neutral position, breaking the circuit of motor 55 and deenergizing magnet 64. The frequency has thus been returned to the desired value but no corrections has yet been made to compensate for the period of time during which the frequency exceeded the desired value. This compensation is effected by the gradual removal of the tension of spring 48 by motor 61, which became energized when rod 44 was raised sufficiently by motor 55 to close contacts 49 and 51. During operation of motor 55, the operation of motor 61 only tends to retard the upward travel of the rod, but, upon return of lever 35 to neutral with consequent deenergization of motor 55, motor 61 operates in a direction to gradually return rod 44 toward its initial position and to thus remove from the balance 35 the tension of spring 48. This causes a further closure of contacts 36 and 37 to further decrease the generated frequency. The decrease in frequency to a value below that desired causes movement of member 33 to the left with a consequent return in tension of spring 41 toward its initial value, which results in a closure of contacts 36 and 38, energization of motor 55 and electromagnet 65; motor 55 now operating to lower rod 44 and hence to increase its rate of return to normal position, and magnet 65 operating to increase the frequency to the desired value. Preferably the apparatus is so adjusted that when 33 is returned to the mid-position the tension of spring 48 has likewise been returned to normal and the regulation is completed.

As member 33 is continuously moved in one direction when the frequency is above that desired and moved continuously in the opposite direction when the frequency is too low, and as operation of the various parts will not cease until member 33 is in the normal central position of device 25, it follows that the regulation must continue until the average frequency is that desired.

To shift from complete automatic to semimanual control of the generators it is only necessary to turn each switch 86 to the manual position, whereupon the speeds of each turbine may be regulated by the push buttons S and F upon the control board. If it is desired, while under automatic operation, to remove one or more generators from the line, or to control the same independently of the others, then it is only necessary to shift the switches 86 associated with the particular turbines for which independent control is desired. Obviously, a greater or a less number of generators may be controlled together by suitably varying the number of contact bands 75 on each drum controller and similarly varying the number of stationary contacts associated therewith.

I have now described and illustrated one complete system for regulating electrical frequency constructed according to my invention. I have described the regulating unit 34 for the sake of simplicity, as being in the form of that disclosed in my above mentioned Patent No. 1,658,577. In a co-pending application, Serial No. 346,917, filed March 14, 1929, I have disclosed and claimed an improved regulator of this type, and such improved regulator could be used and preferably is used, as the regulating unit of my present invention. Various substitutions and rearrangements of other parts of my apparatus could of course be made without departing from the spirit of my invention, and certain parts could be advantageously employed without the corresponding use of other parts.

I claim:

1. In a frequency regulator, two rotatable elements, means for driving one of said elements at a standard rate of rotation, means for driving the other of said elements at a rate of rotation varying with the frequency to be controlled, a differential speed device adapted to compare the rates of rotation of said elements, said device comprising a rod having one of said elements screw-threadedly mounted at one end and having the other of said elements keyedly mounted at the other end, a member rotatably mounted on said rod and longitudinally movable therewith, a regulator associated with said device and adapted when operated to control the frequency, and means for causing operation of said regulator upon departure of said member from normal position and for continuing the same in operation until said member returns to normal position.

2. In a frequency regulator a rotatable element and driving means therefor, a second rotatable element adapted to be frictionally driven by said first element, master clock controlled means for intermittently arresting the rotation of said second element to reduce the same to a standard, a member adapted to be rotated at a rate varying with the frequency to be controlled, a differential speed device adapted to compare the rate of rotation of said member with the standard rate of said second element, said device including a member movable in one direction or the other when said compared rates differ, and means for controlling the frequency by the displacement of said last mentioned member from normal position.

3. A frequency regulator comprising in combination a device adapted to compare the frequency to be controlled with a standard frequency, said device including a member movable in one direction when the frequency exceeds the standard and movable in the other direction when the frequency diminishes below the standard, a balancing device normally acted upon by a force responsive to the position of said member and by a constant force, control means brought into operation upon the departure of said balancing device from neutral position for adjusting the frequency, compensating means brought into operation simultaneously with said control means for adding a force to said balancing device in a direction tending to restore neutrality thereof and slower acting means later brought into operation, tending to reduce and remove said additional force.

4. In a frequency regulator, a differential speed device comprising a member adapted to be continuously moved in one direction when the frequency is above the desired value and to be continuously moved in the opposite direction when the frequency is below the desired value, a balance acted upon by a constant force and by an opposing force varying with the position of said member, and means controlled by departure of said balance from neutral upon variation in said opposing force for adjusting the frequency until said opposing force returns to its initial value whereby the average frequency is maintained constant.

5. In a frequency regulator the combination comprising a member adapted to be continuously moved in one direction when the frequency is above that desired and to be continuously moved in the opposite direction when the frequency is below that desired, means, including a balance normally maintained in neutral position by opposing forces, one of which varies with the position of said member, for adjusting the frequency upon movement of said member and for continuing to adjust the frequency until said balance is in equilibrium due to return of said member to its initial position whereby average frequency is maintained constant.

6. The combination according to claim 5 wherein said means includes devices associated with said balance adapted to adjust the frequency and to add a force to the balance in a direction to restore neutrality thereof, and to thereafter remove said added force.

7. A frequency regulator comprising a balance acted upon by a force varying with the integrated value of the departure of the frequency from the desired frequency and by a constant, means brought into operation upon departure of the balance from neutral adapted to adjust the frequency and to apply an additional force to the balance in a direction to restore neutrality thereof, and means later brought into operation for gradually removing said additional force.

8. A frequency regulator for turbo-generators operating in parallel comprising in combination independent speed controlling devices at each turbo-generator, a drum controller adapted when rotated to coact with said devices to proportionately reduce the controlled speed for each turbo-generator, a second drum controller adapted when rotated to coact with said devices to proportionately increase the controlled speed for each turbo-generator, a device adapted to compare the frequency of the current generated by said turbo-generators with a standard frequency, said last mentioned device including a member movable in one direction when the frequency exceeds the standard and movable in the opposite direction when the frequency falls below the standard, and a regulating unit comprising a balancing device acted upon by a force varying with the position of said member and adapted during departure in one direction from neutral to cause rotation of one of said drum controllers and during departure in the other direction from neutral to cause rotation of the other of said drum controllers.

9. The combination according to claim 8 wherein fractional rotation of either drum controller is prevented by tripping means associated with each controller and with the regulating unit whereby rotation of either drum controller only ceases after completion of the rotation during which the balance returned to neutral.

10. The combination according to claim 8 wherein coaction between said drum controllers and said speed controlling devices is effected by closure of electric circuits during parts of each rotation of said controllers, and wherein control switches are provided in said circuits whereby independent manual control of any of said speed controlling devices may be substituted for the automatic control thereof.

11. A frequency regulator for a prime mover comprising in combination an independent speed controlling device at the prime mover, a drum controller adapted when rotated to coact with said device to proportionately reduce the control of speed of the prime mover, a second drum controller adapted when rotated to coact with said device to proportionately increase the control of speed of the prime mover, a device adapted to compare the frequency of the current generated by said prime mover with standard frequency, said last mentioned device including a member movable in one direction when the frequency exceeds the standard and movable in the opposite direction when the frequency falls below the standard, and a regulating unit comprising a balancing device acted upon by a force varying with the position of said member and adapted during departure in one direction from neutral to cause rotation of one of said drum controllers and during departure in the other direction from neutral to cause rotation of the other of said drum controllers.

In testimony whereof, I have signed my name to this specification.

CHARLES H. SMOOT.